United States Patent
Boniecki

(10) Patent No.: US 11,237,948 B2
(45) Date of Patent: Feb. 1, 2022

(54) RENDERING ENGINE COMPONENT ABSTRACTION SYSTEM

(71) Applicant: Lionbridge Technologies, Inc., Waltham, MA (US)

(72) Inventor: Artur Boniecki, Bydgoszcz (PL)

(73) Assignee: Lionbridge Technologies, LLC, Waltham, MA (US)

(*) Notice: Subject to any disclaimer, the term of this patent is extended or adjusted under 35 U.S.C. 154(b) by 0 days.

(21) Appl. No.: 16/030,873

(22) Filed: Jul. 10, 2018

(65) Prior Publication Data

US 2019/0034319 A1 Jan. 31, 2019

Related U.S. Application Data

(60) Provisional application No. 62/537,019, filed on Jul. 26, 2017.

(51) Int. Cl.
*G06F 9/44* (2018.01)
*G06F 11/36* (2006.01)
*A63F 13/77* (2014.01)
*A63F 13/52* (2014.01)

(52) U.S. Cl.
CPC .......... *G06F 11/3664* (2013.01); *A63F 13/77* (2014.09); *G06F 11/3608* (2013.01); *A63F 13/52* (2014.09)

(58) Field of Classification Search
CPC .. G06F 11/3664; G06F 11/3608; A63F 13/77; A63F 13/52
See application file for complete search history.

(56) References Cited

U.S. PATENT DOCUMENTS

| | | | | |
|---|---|---|---|---|
| 2002/0154214 A1* | 10/2002 | Scallie | ................. | G02B 27/017 |
| | | | | 348/51 |
| 2005/0209994 A1* | 9/2005 | Noro | ..................... | G06F 16/951 |
| 2005/0228621 A1* | 10/2005 | Matsuo | ................... | H04L 41/22 |
| | | | | 703/1 |
| 2011/0138314 A1* | 6/2011 | Mir | ......................... | G06F 9/452 |
| | | | | 715/779 |
| 2013/0305222 A1* | 11/2013 | Cinar | ........................ | G06F 8/30 |
| | | | | 717/124 |
| 2016/0140033 A1* | 5/2016 | Alexeevich | ............ | H04L 67/10 |
| | | | | 717/125 |

* cited by examiner

*Primary Examiner* — Chat C Do
*Assistant Examiner* — Lenin Paulino
(74) *Attorney, Agent, or Firm* — Blueshift IP, LLC; Cynthia M. Gilbert

(57) ABSTRACT

The subject matter discloses a system for testing an application or a game build on top of a rendering engine, the system comprises an agent configured for running on a first computing device; the first computing device is configured for running the game or said application; a test framework installable on a second computing device, the test framework is configured for receiving one or more instructions related to a test of said game or the application from a user and for transmitting the one or more instructions to the agent; wherein the agent is further configured for communicating with the test framework for extracting one or more object properties of the game or the application in response to the one or more instructions and for providing to the test framework to access to the one or more object properties.

10 Claims, 15 Drawing Sheets

RENDERING ENGINE COMPONENT ABSTRACTION SYSTEM

FIELD OF THE INVENTION

The present disclosure relates to rendering engines in general, and to testing the products built on top of the rendering engines, in particular.

BACKGROUND OF THE INVENTION

Rendering or image synthesis is the automatic process of generating a photorealistic or non-photorealistic image from a 2D or 3D model (or models in what collectively could be called a scene file) by means of computer programs.

Rendering engines provide all the functionality that is required for designing a video game or an application isolating the developer from low level mathematical, physics and graphics implementation need. The functionality includes the rendering, the sound and the graphics together with user interaction, physics models and mathematical calculations.

SUMMARY OF THE INVENTION

The term computing device refers herein to a device that includes a processing unit. Examples for such device are a personal computer, a laptop, a server, a tablet and a cellular device and IOT (internet of things) device.

The term RECAS refers herein to Rendering Engine Component Abstraction System.

The term external system refers herein to a system that utilizes the RECAS for testing.

One exemplary embodiment of the disclosed subject matter is a method and system for automating the testing of products that are built on top and that are generated by a rendering engine. The products are video games or any graphical application. The testing of the products may include the aspects of functionality, localization, stability and performance.

The term object property refers herein to an element in a game or an application that can be referred to and manipulated by the operating system typically as a result of scenario in a game or an application caused by an interaction of the user. Examples of such object properties are visibility on a screen/scene, size, position (x/y coordinates or x, y, z coordinates in 3d environment), clickability and touchability.

Test automation is one of the critical elements of software development process dictated by customer need of assuring high quality of the product within short period of time. Manual based testing contradicts this expectation so in many domains of software, test-automation must be introduced. This includes auto-testing of native applications installed on different platforms/operating systems and auto-testing of web based applications executed in web browser environment.

Native application and Web base applications are well understood and there are techniques allowing efficient automation of testing. As an example—native apps available on Android or IOS platforms are connected directly with window management/UI controller layer, exposing interface to its UI environment and its properties and functions, allowing simulation of real app usage behavior. The same happens in all apps available via web browser. Web browser being execution environment for the application gives access to its components using standard DOM (Data-Object-Model) like structures and allows discovery of topology of the UI elements, their activity parameters and features.

One technical problem disclosed by the present invention is how to provide access to the graphical elements for auto-testing an application or a game that is developed on a rendering engine.

In case of applications (including games) built on top of rendering engines there is no direct connection to window manager/UI controller layer of operating system/platform. This results with disability of elastic steering of the app behavior from external system, having no knowledge of the components visible on the screen during app interaction.

In current industry state, there is no automation testing solution sufficient for applications built on the top of rendering engines (eg. Unity/Unreal Engine). Known in the art automating testing solution omit the OS (operating system) level services and use direct screen access which does not allow getting any information about UI layer. Such known in the art solutions do not provide feedback from application about current content displayed on the screen. Existing, primitive automation tools can only perform action based on the screen coordinates without any validation, leading to auto-test scenario errors and the inability to perform some actions which are important for the testing.

Test developers may try to get some basic information about state of the application via system logs and parsing text data or try to use complicated image recognition algorithms to take screenshot and compare the screenshot with predefined assets and make decision based on them.

Such known in the art methods are not easy to implement and not assure full reliability during test execution. Such known in the art methods are hard to maintain.

One technical solution, is allowing to receive topology information (such as structures that include information about the graphical component) and to interact with the application/game dynamically. The dynamic interaction is performed by sending steering information and inputs simulation directly to window manager/UI controller layer or bypassing the window manager and UI controller layer by transferring the requests directly to RECAS subcomponent.

By using such a solution the external system (the system which is using the RECAS technology) may interact with the tested applications/games and may provide information about the tested application/games.

The solution may be implemented on any type of operating systems and/or platforms including mobile operating system, Android, or PC or game console platforms.

By using such a solution the external system allows the user to write customized automated test scenario tailored to user needs without enforcing any automatic pass/fail criteria for such test domain; thus a user can freely develop it's own scenario. The behavior and logic of executed scenario may be changed without the necessity to change the scenario itself.

By using such a solution the external system checks the stability of the application during multiple executions of the same test scenario to make sure that test is finished with success over many retries without application crash.

By using such a solution the external system provides measurements of basic performance metrics important from mobile applications perspective.

By using such a solution the external system provides the monitoring of the following:
  FPS—Number of Frames Per Second
  CPU—% usage of the device processors
  Memory—% usage of the device memory Metrics list can be enhanced:

Disk I/O—read/write activity on disk

Network I/O—up/down transfer on network

Battery—consumption of battery power

Temperature—Battery—temperature of battery

Temperature—CPU—temperature of CPU

By using such a solution the external system provides the checking of correctness of the texts translations for different languages for different device resolutions. The external system provides localization tests based on the screenshots which are executed at given time accordingly to tester expectations. Screenshots are post processed with using of the OCR module allowing detecting fonts and identifying discrepancies in texts.

By using such a solution the external system verifies and validates the correctness of analytics events triggered in game. For example the system may check the format of the events and the number of parameters that are sent in expected moment.

By using such a solution the external system provides monkey tests. Monkey tests do not require the writing of any automated test scenario for tested application. Monkey test allow the starting of an application and the clicking on the randomly X/Y coordinates with defined time interval between steps. Monkey tests require minimal level of integration of Micro-service in the tested application.

By using such a solution the external system provides automatic detection of the test execution status and the analysis of the scenario correctness by handing over the decision to the system By using such a solution the external system provides interaction (downloading information about the game status) and dynamic adaptation of tests to the data displayed on the screen By using such a solution the external system provides annotations. The annotation is a mechanism which allows the marking of special points during test executions with additional text message. There are three level of annotations:

Actions—sent manually from the test scenario, defined by the test developer during writing of test scenario.

Screenshots—added automatically every time when test scenario triggered screen capturing.

Sections—added automatically every time when test scenario detects that screen name has been changed (as result of the getScreen request).

By using such a solution the external system provides detailed reports for each test execution. The reports may contain the following information:

General information about launched scenario, used device, time interval, test status with detailed information about failure reason, and platform Screenshots which are the basis for assessing the correctness of the displayed content for, among others, localization tests or verification of graphic-display correctness by the tester, Performance metrics statistics in the summarized form (median, average) is the basis for reports comparing resource consumption for the same scenarios in different types of devices, or different versions of build for a given application.

Performance interactive graph showing consumption of the system resources by the tested application over time and annotations A crash log file which is a grabbing module that ensures coupling with the operating system and detection of crashes/core dump after restarting the application. Log files according to level of logging.

Last step detection which returns the last screen name achieved during test execution, useful to find potentially weak points of tested application.

One other technical problem is how to provide to the tester control over the objects that are tested.

One other technical solution is allowing a tester to select the object properties to be exposed, According to some embodiments the tester may select which object properties of the game or application to test in a certain scenario.

According to some embodiments the system provides the tester an option to select the object properties that are tested by the system. After the tester selects the object properties the system extracts the object property during the playing of the application/game. The extracting may be performed by interacting with the application/game via API (application interface commands). The system then interacts with the application components using extracted properties.

The system then provides the tester the option to use and/or manipulate the object properties in order to test the game/items. The tester can, for example, activate commands on the object properties for monitoring behavior of the object properties. The tester can also move the object from one position to the other.

The system provides the tester GUI which enables him to perform the test. The operations of the tester are translated into API commands which are imposed on the game/application.

One embodiment of the disclosed subject matter is a system for testing an application or a game build on top of a rendering engine, the system comprises an agent configured for running on a first computing device; the first computing device is configured for running the game or said application; a test framework installable on a second computing device, the test framework is configured for receiving one or more instructions related to a test of said game or the application from a user and for transmitting the one or more instructions to the agent; wherein the agent is further configured for communicating with the test framework for extracting one or more object properties of the game or the application in response to the one or more instructions and for providing to the test framework to access to the one or more object properties.

According to some embodiments the test framework interacts with the object framework for simulating controlling action. The interaction is performed by, for example, executing UI controlling actions like swipe, multi-touch, tap or directly by the UI controller part of the operating system.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
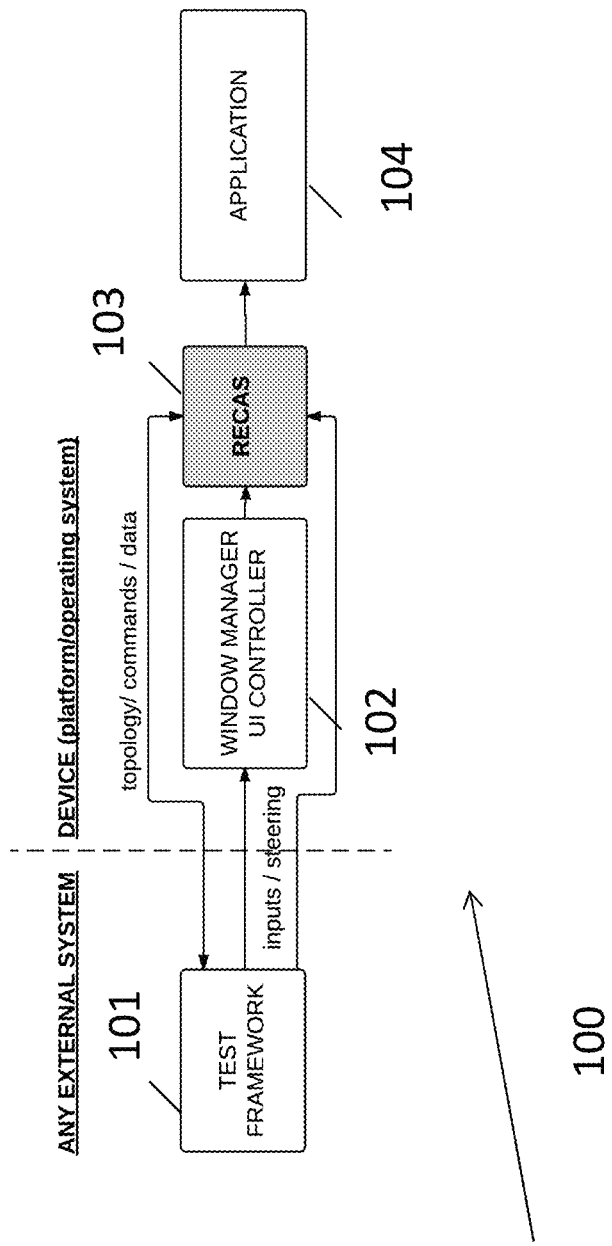
FIG. 1 shows a block diagram of an environment of the rendering engine component abstraction system; in accordance with some exemplary embodiments of the subject matter.

FIG. 1 shows a block diagram of an environment for interfacing with graphical elements of the rendering engine in accordance with some exemplary embodiments of the subject matter. The environment 100 includes test framework 101 interacting with window manager UI controller 102 and with the Rendering Engine Component Abstraction System (RECAS) 103. The rendering engine component abstraction layer 103 interfaces between the test frameworks 101, the window manager UI controller 102 and the application or game 104.

Figure 2:
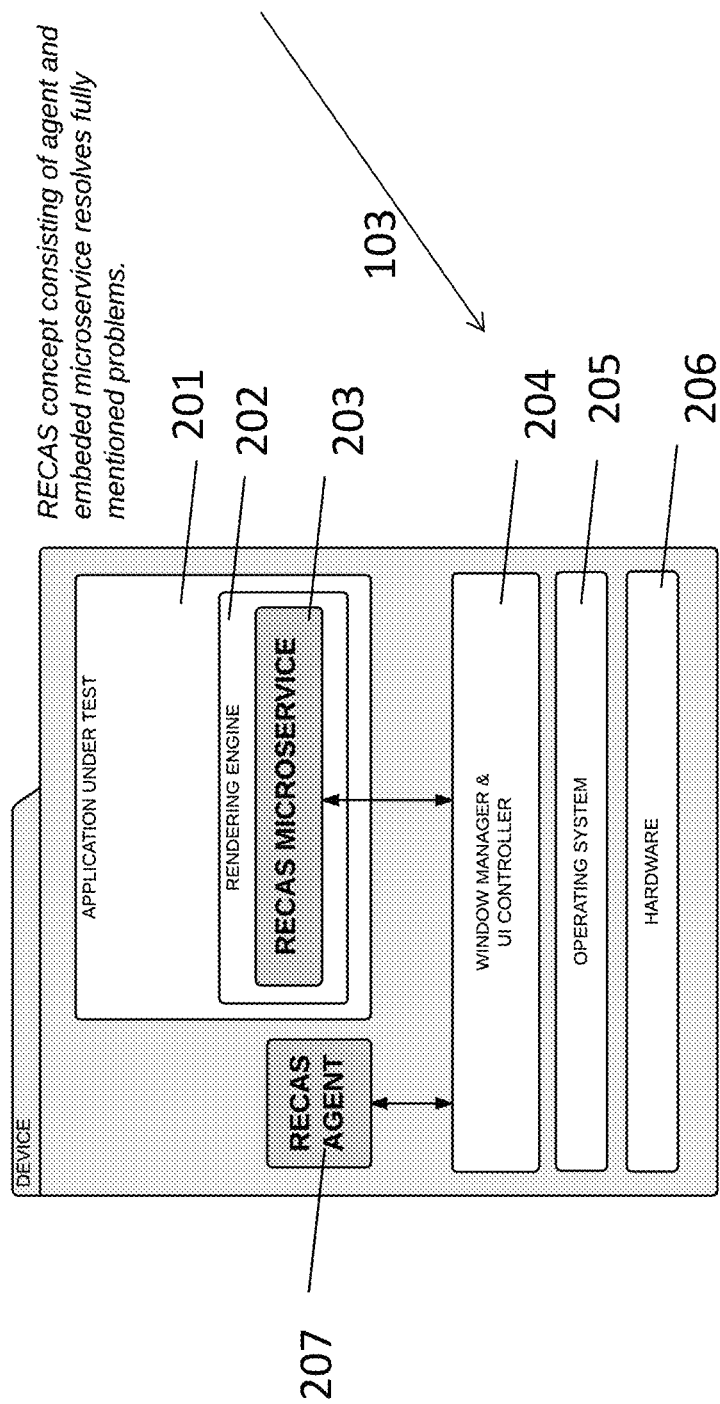
FIG. 2 shows a block diagram of the architecture of the rendering engine component abstraction system in accordance with some exemplary embodiments of the subject matter.

Test Framework 101 receives information about application/game screen/scene components/elements connecting directly to the agent, The Test Framework 101 interacts with the extracted components/elements properties by either the agent or directly via the window management UI controller 102 of the operating system, The rendering engine component abstraction layer 103 is explained in greater details in FIG. 2 shows a block diagram of the architecture of the Rendering Engine Component Abstraction System; in accordance with some exemplary embodiments of the subject matter. The system 103 includes an agent 207 and a micro-service 203.

The agent 207 runs on the platform as an individual background process. In another embodiment the agent 207 is embedded into the application under test (depending on the developer needs or convenience). The role of the agent is to establish communication between external system and an instance of device on which the application or the test is tested.

The agent 207 is configured to launch/terminate tested application, to execute controlling commands sent from external system to the application, to convey response data back to external system, executing screenshots, and to measure crucial parameters from testing perspective.

The agent 207 contacts the micro-service 203. The micro service engine 203 is installed in the rendering engine 202 of each device that tests an application or a game that is developed with a rendering engine. The micro-service 203 may contact with the window manager UI controller 204 of the device with the operating system 205 of the device and with the hardware 206 of the device.

The role of the micro service 203 is to interact with tested application or game 201 based on the received command from agent 207. The micro service engine 203 executes API interface/methods for communicating between the test framework and the rendering engine. Examples of such methods are provided in FIG. 4

It should be noted that agent 207 may be separate process executed on the device, interacting with application under test, or may be embedded into the application under test.

Figure 3:
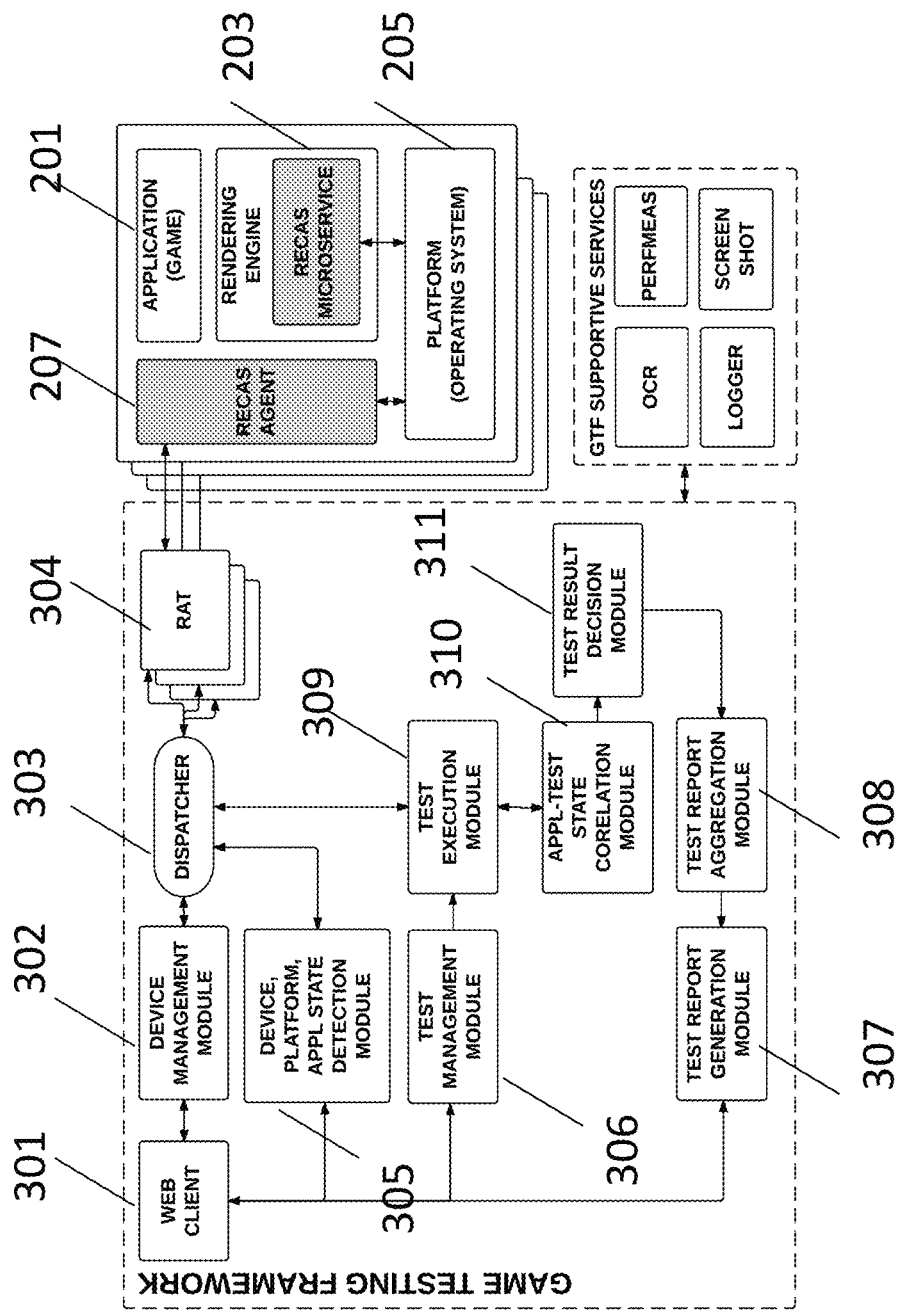
FIG. 3 shows a block diagram of the main modules of the external system using the rendering engine component abstraction system; in accordance with some exemplary embodiments of the subject matter.

FIG. 3 shows a block diagram of the main modules of the external system; in accordance with some exemplary embodiments of the subject matter.

The external system for rendering engine component abstraction includes web client 301, device management module 302, device platform application state detection module 305, test management module 306, test execution module 309, test state correlation module 310, test result decision module 311, test report aggregation module 308, test report generation module 308, rat 304 and dispatcher 303.

The Web Client module 301 is configured for providing the GUI (graphical user interface) for the web server. The Web Client module may be supported by web server, relational database such as Apache Server with PHP server-side scripting language.

The Web server is configured for providing a primary access point for contractors allowing business care, system and test management, reports visualisation and security access. Varied functionality is provided by, for example, web server MySQL database and access to other Back End services (modules). End user interface is professional admin dashboard with fully responsible control panels. Responsive HTML template is based on the CSS framework such as Bootstrap 3. It utilizes all of the Bootstrap components in its design and re-styles many commonly used plugins to create a consistent design The Device Management Module 302 is configured for providing administrative layer for handling of the physical devices. The Device Management Module 302 is responsible for adding new physical devices into GTF system and for configure them.

The Device, Platform, Application State Detection Module 305 is configured for allowing the user to select and choose appropriate set of devices which are used during automated testing. The module provides the option to define device type and model and OS version and shows current status of the devices (online, offline, busy, etc.). The module is also responsible for installing application on the mobile device before test execution and make sure that process finished successfully.

The Test Management Module 306 is configured for maintaining user's automated scenarios in the GTF. Each tested application has own storage space where user can upload own automated scenarios via GUI. The GTF validate structure of the script, check for potential errors and exposes tests for test execution module.

The Test Execution Module 309 is configured for starting of the execution of test scenario starting from launching the Agent and tested application, trough proceeding accordingly to the actions designed via test developer in the automated scenario.

The App1-Test State Correlation Module 310 is configured for conducting ongoing correlation of detected states, gaming behavior and application logs with the state of the testing process in the aspect of time and detected events. The game status is critical information for the analyzer. The App1-Test State Correlation Module 310 evaluates and compares the effect of stimulation (testing stage) in the game with the expected response (testing stage), which is saved in the test scenario.

Test Result Decision Module 311 is configured for confirming or denying the operation of the test in a given test scenario. The decision of the module is based on the information from the correlator of the test, game status and the chosen test domain and other criteria.

Test Report Aggregation Module 308 is configured for processing results data and aggregates them before attaching to report.

Test report Generation Module 307 is configured for generating reports on testing domains, builds, equipment and the like.

The RAT 304 is the Proxy server between GTF (Game Testing Framework) system and RECAS components. The RAT 304 is configured for establishing and maintaining connections with all RECAS instances, translating REST (Representation State Transfer) request into appropriate protobuf commands and hosting separate buffers (HUI—Hardware Usage Indicators (Performance metrics), LOG —Logs, AC—Analytics Collector) for each device.

The Dispatcher 303 is configured for providing simultaneously tests execution on group of devices. The dispatcher verifies separation between each test execution. The dispatcher isolates traffic dedicated to different RAT servers and handles different device connections.

FIGS. 4*a*, 4*b*, 4*c*, 4*d*, 4*e*, 4*f*, 4*g*, 4*h*, 4*i*, 4*j* and 4*k* show a block diagram of exemplary functions of a system for rendering engine component abstraction; in accordance with some exemplary embodiments of the subject matter.

Figure 4A:
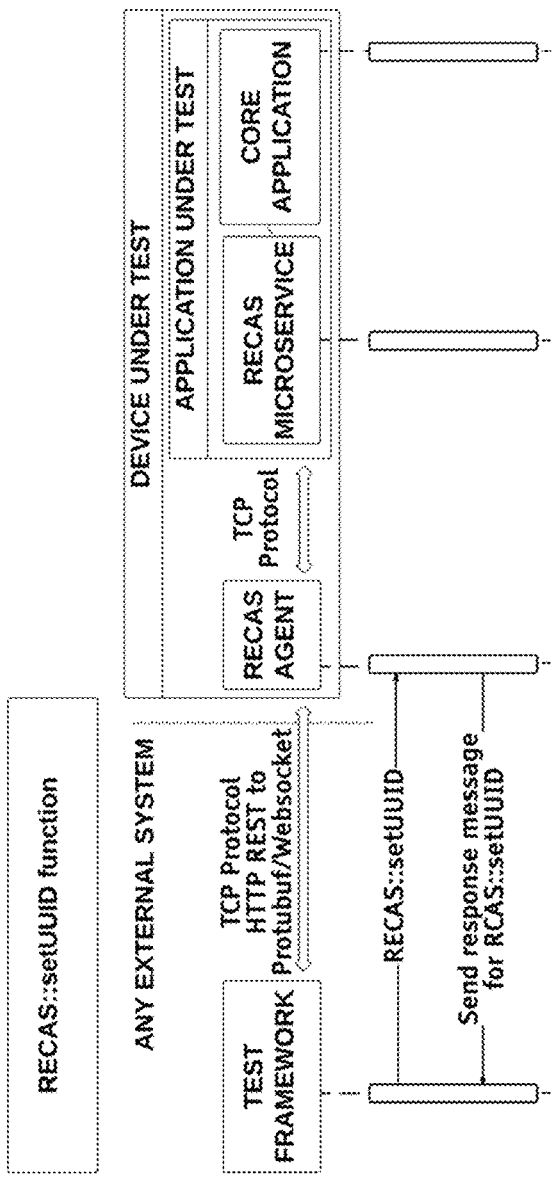
FIGS. 4a, 4b, 4c, 4d, 4e, 4f, 4g, 4h, 4i, 4j and 4k show a block diagram of exemplary functions of a system for rendering engine component abstraction; in accordance with some exemplary embodiments of the subject matter.

FIG. 4*a* shows a block diagram of the recas: setuuid function. This function sets unique identifier of the device, on which the application is installed and tested. The global uniqueness may be achieved via generating SHA-1, SHA-256 or other alphanumeric string with near-zero conflict probability. According to some embodiment RAT sends the setuuid command, for the first time the device is used/and application is installed.

Figure 4B:
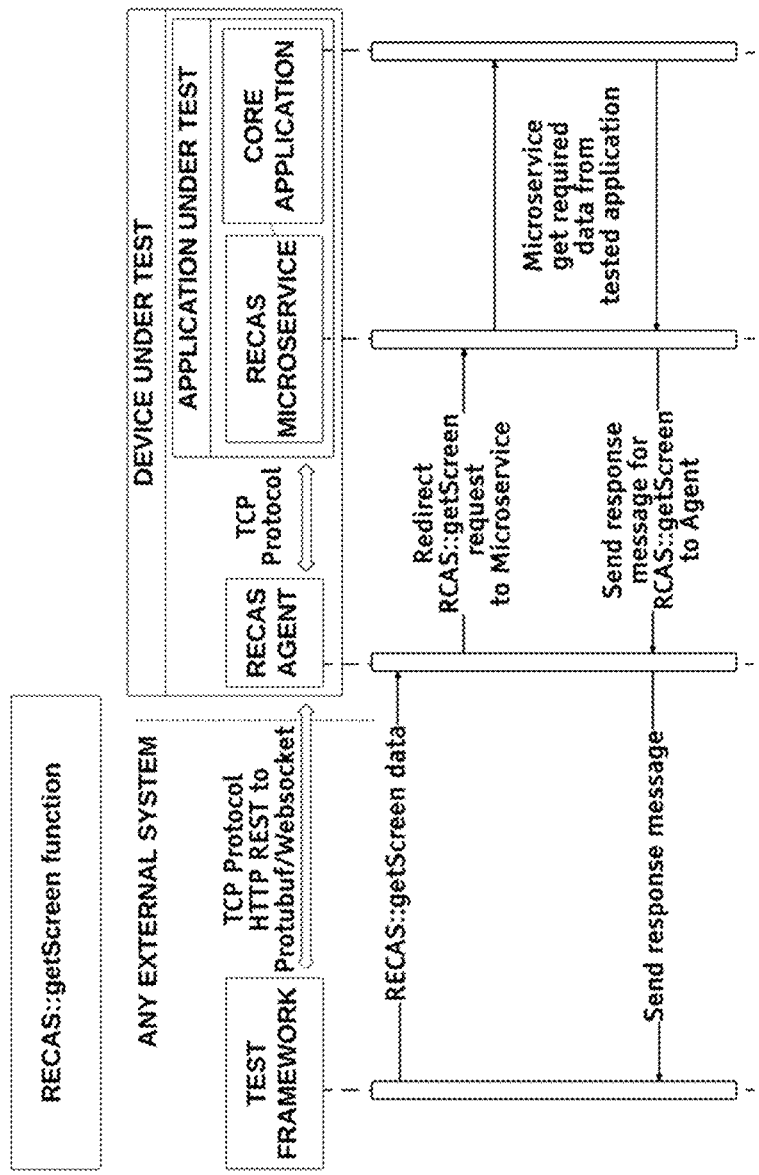

FIG. 4*b* shows a block diagram of the RECAS::getScreen function. This function provides information about menu page, visible on the application under test. The main data includes screen ID or name, its physical and virtual size in pixels, JSON/DOM like structures are sent in the response of the request, building the topology of the screen under test. The function extracts the selected object properties from the scene and may also extract properties associated with the extracted object properties. It is up to developer integrating RECAS into the application what kind of objects/elements/components are extracted or not. In other words, as an example, the developer can decide to expose all buttons available on the scene and not extract all text boxes.

Figure 4C:
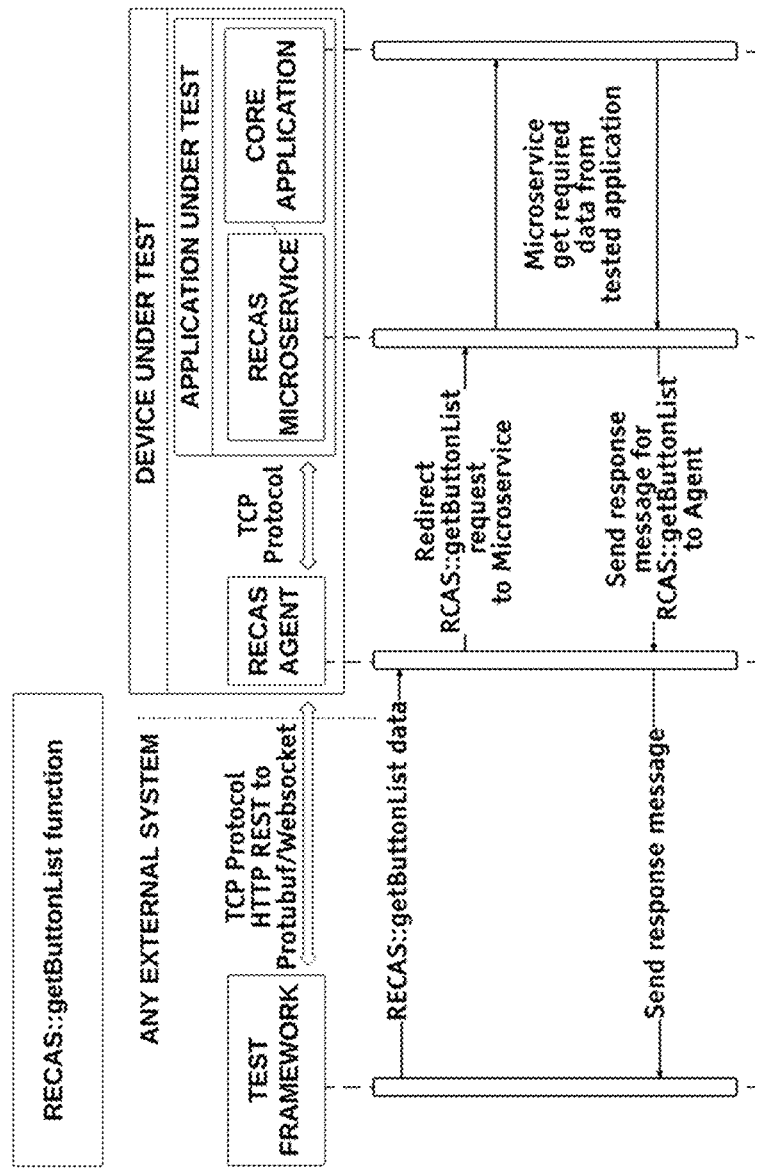

FIG. 4*c* shows a block diagram of the RECAS::getButtonList function. The function returns information about all visible buttons on the screen. The function includes data such as: button id or name, x/y coordinates, normalized center x/y coordinates, x/y size of the button. The normalized data provides the ability to identify button position regardless of the actual screen resolution of the device that runs the application under test. Structures such as JSON/DOM are sent in the response of the request, building the topology of the screen under test. It is up to developer integrating RECAS if he/she wishes to extract button information or not.

Figure 4D:
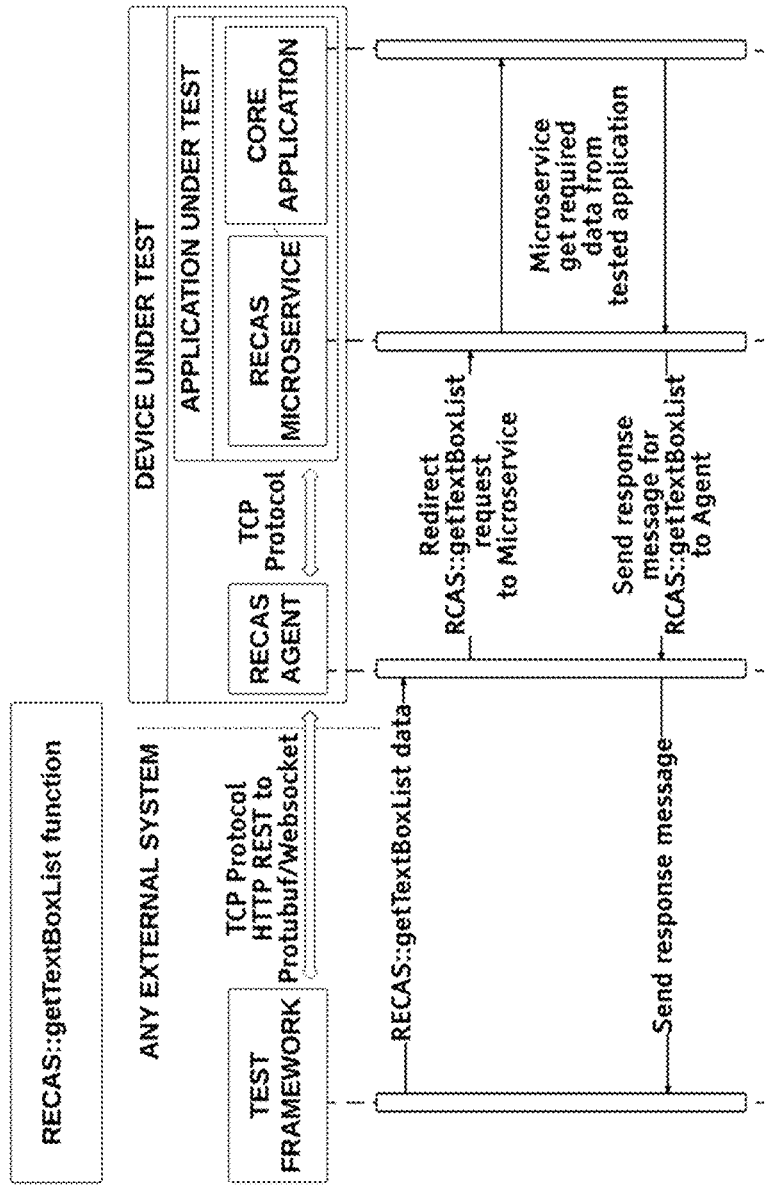

FIG. 4*d* shows a block diagram of the function RECAS::getTextBoxList. The function returns information about all visible text areas on the screen. The function includes data such as: text area id or name, x/y coordinates, normalized center x/y coordinates, x/y size of the text area. The normalized data provides the ability to identify text area position regardless of the actual screen resolution of the device the application under test is running Structures such as JSON/DOM are included in the response of the request, building the topology of the screen under test. It is up to developer integrating RECAS if he/she wishes to extract TextBox information or not.

Figure 4E:
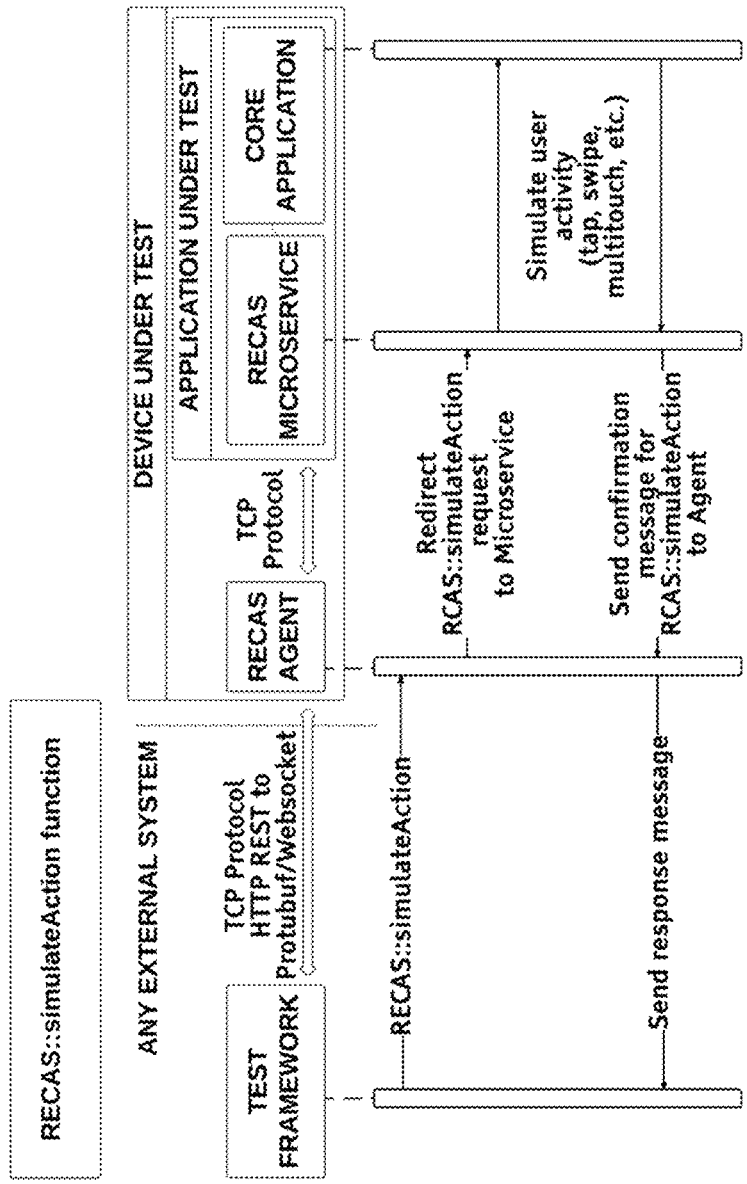

FIG. 4*e* shows a block diagram of the function RECAS::simulateAction. The function simulates manual user interface actions on a given device. Depending on device type/platform, these actions can mimic specialized controllers used in interaction with app, or mimic touch screen actions. The simulated actions depend on device types, platforms. Such actions may include but not limited to tap, combo-type, multi-touch, swipe, controller-left, controller-right, controller-up and controller-down. The simulation is performed by interacting with the operating system. IN one example the system extracts the position of the object property and uses the position for simulating a click command. It is up to developer integrating RECAS if he/she wishes to use RECAS to be an action simulator, or if he/she wishes to redirect such action simulation commands directly to UI window manager of the operating system.

Figure 4F:
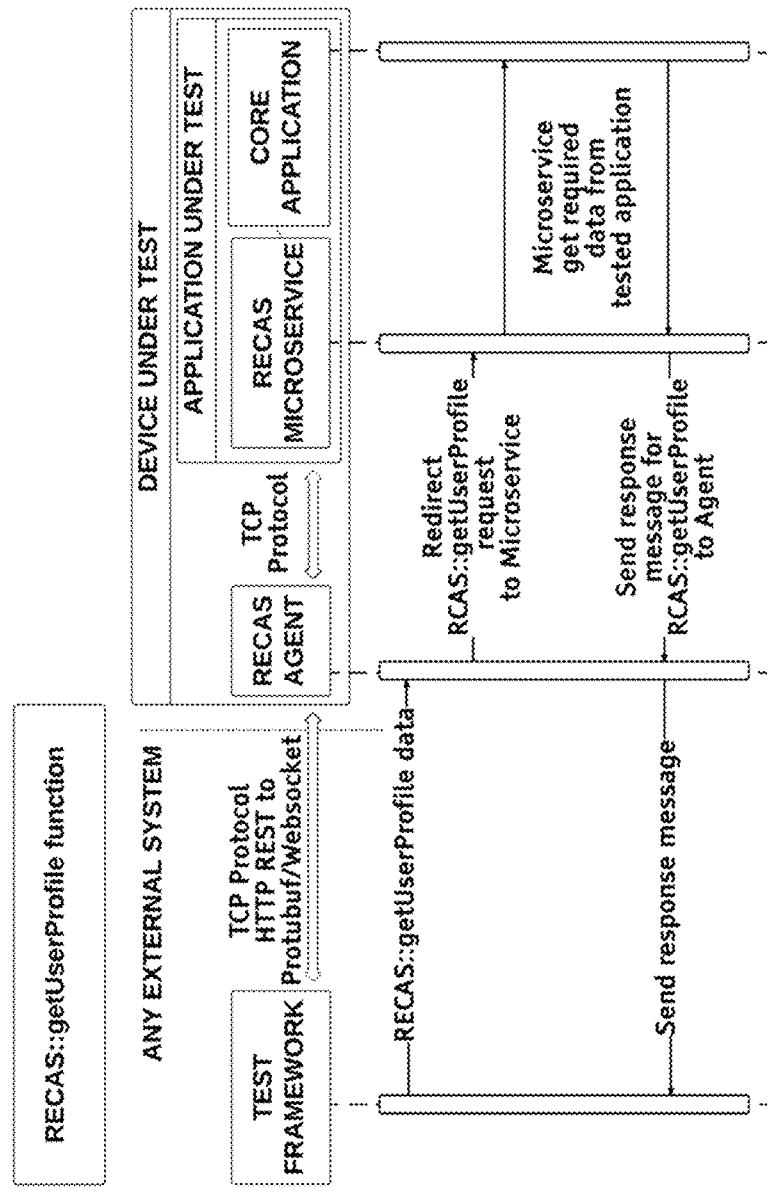
Figure 4G:
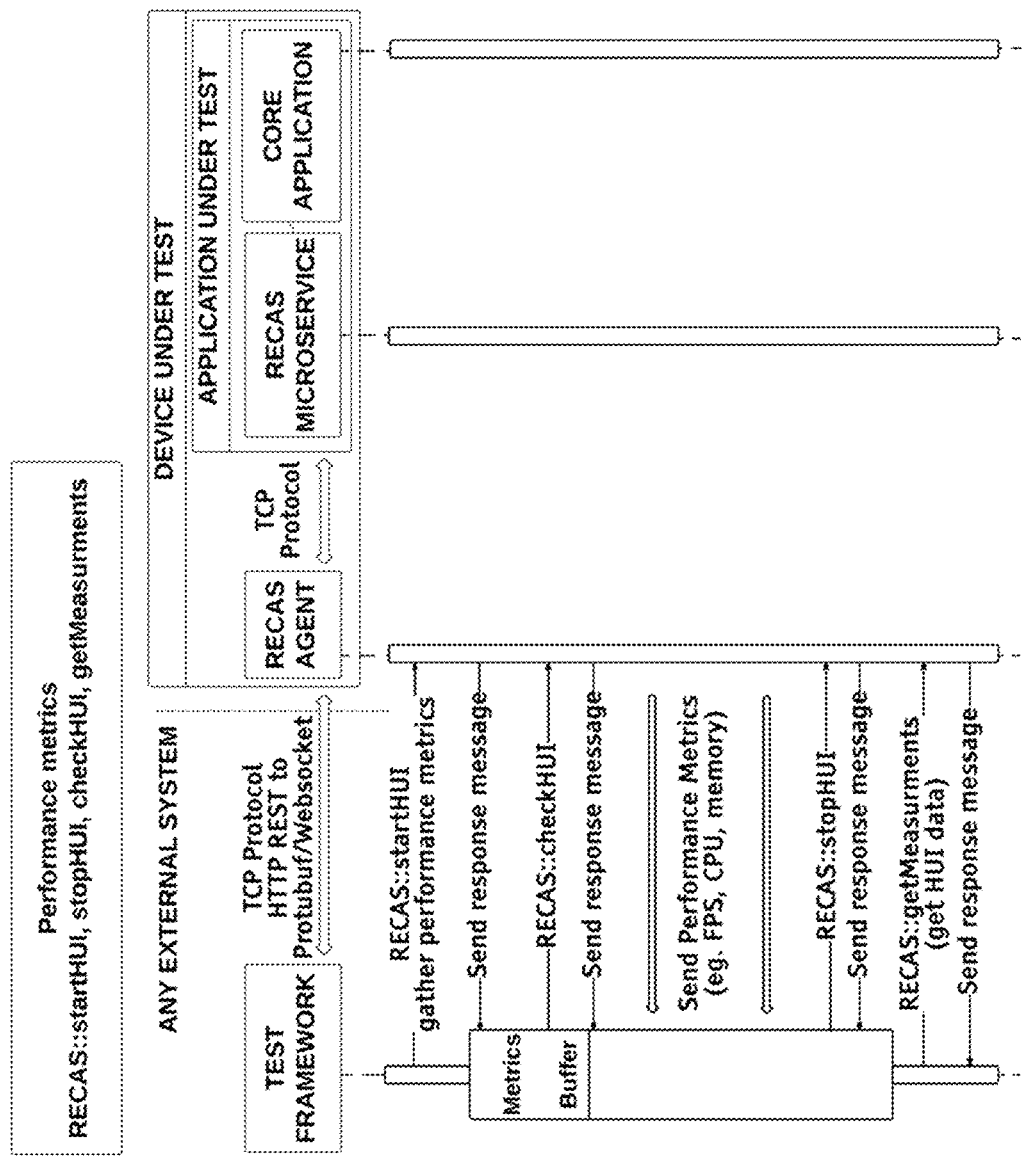
Figure 4H:
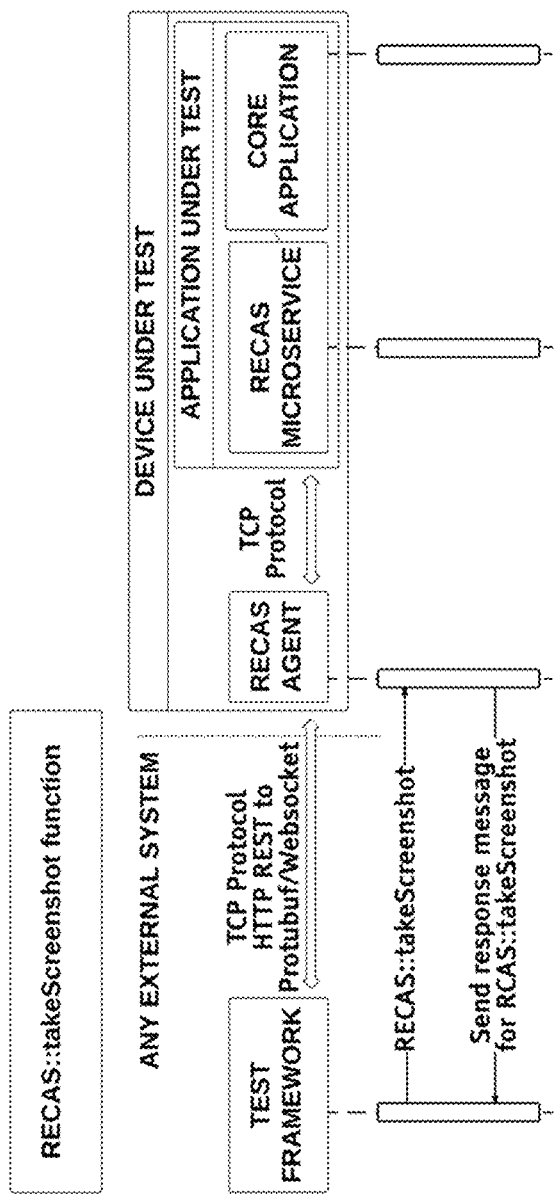

FIG. 4*f* shows a block diagram of the function RECAS::getUserProfile. The function provides information about user properties or features. in case of game industry applications this function returns the player profile custom data. Such data may be but is not limited to status, coins, level, cards, etc. The data may be changed for each application or game. It is up to developer implementing RECAS, what exactly properties will be exposed. FIG. 4*g* shows a block diagram of the function RECAS::getMeasurement. The function provides measurements done against the application under test, assumes measurement data buffering (metrics gathering) on the external system side, set of measurements, depending on device types/platforms: CPU consumption, memory consumption, battery consumption, temperature of CPU, temperature of battery, network traffic in/out, disk in/out. It is up to developer implementing RECAS, what exactly measurements will be exposed FIG. 4*h* shows a block diagram of the function RECAS::takeScreenshot. This function returns the dump of the graphic frame directly from engine rendered environment. The function allows very fast, non performance impacting screenshotting, bypassing system level bitmap dumping functions. It is up to developer implementing RECAS, if he/she allows to do screenshots by the RECAS or not.

Figure 4I:
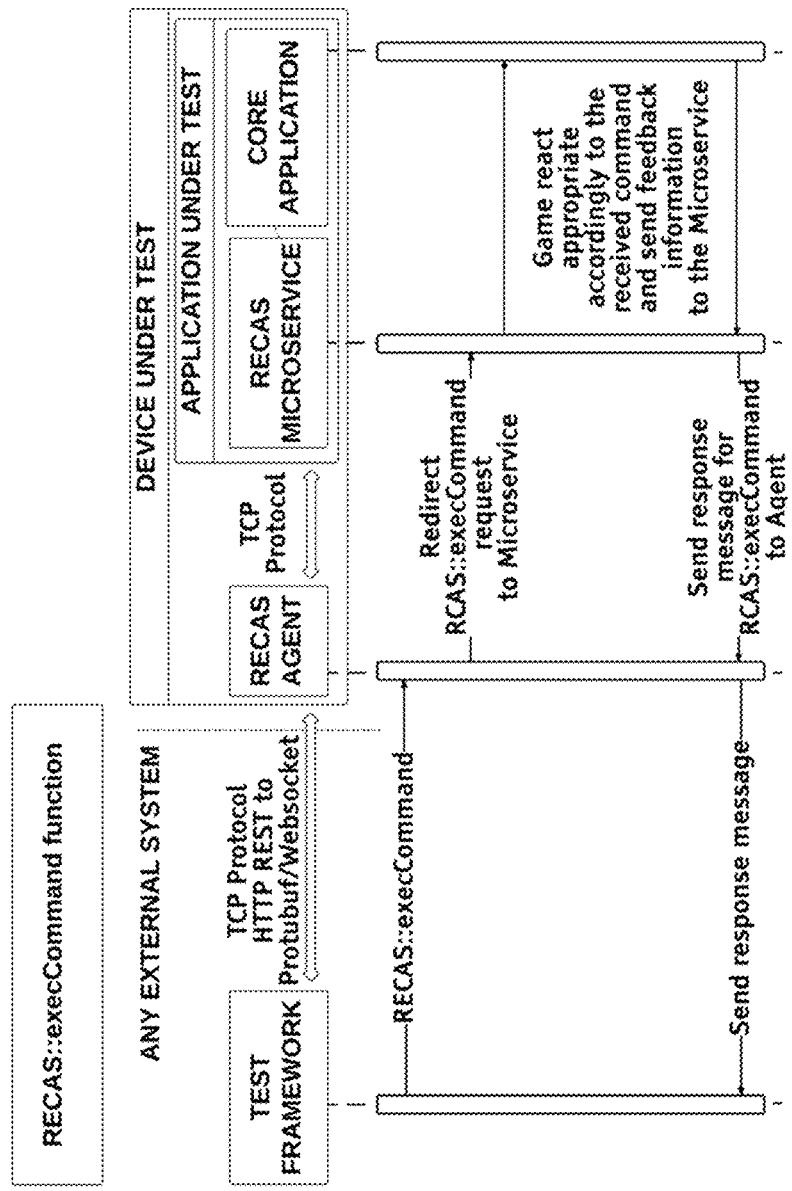

FIG. 4*i* shows a block diagram of the function RECAS::execCommand. The function has transportation role allowing sending to the application under test any kind of commands needed from external system perspective. The functions includes functionality for passing the application specific commands, especially debugging or application control related. Examples of usage include but not limited to: goto background, goto foreground, debug level settings, reloading, disable/enable modules, disable/enable pop-ups, change language etc. It is up to developer implementing RECAS, what exactly commands he/she wants to handle.

Figure 4J:
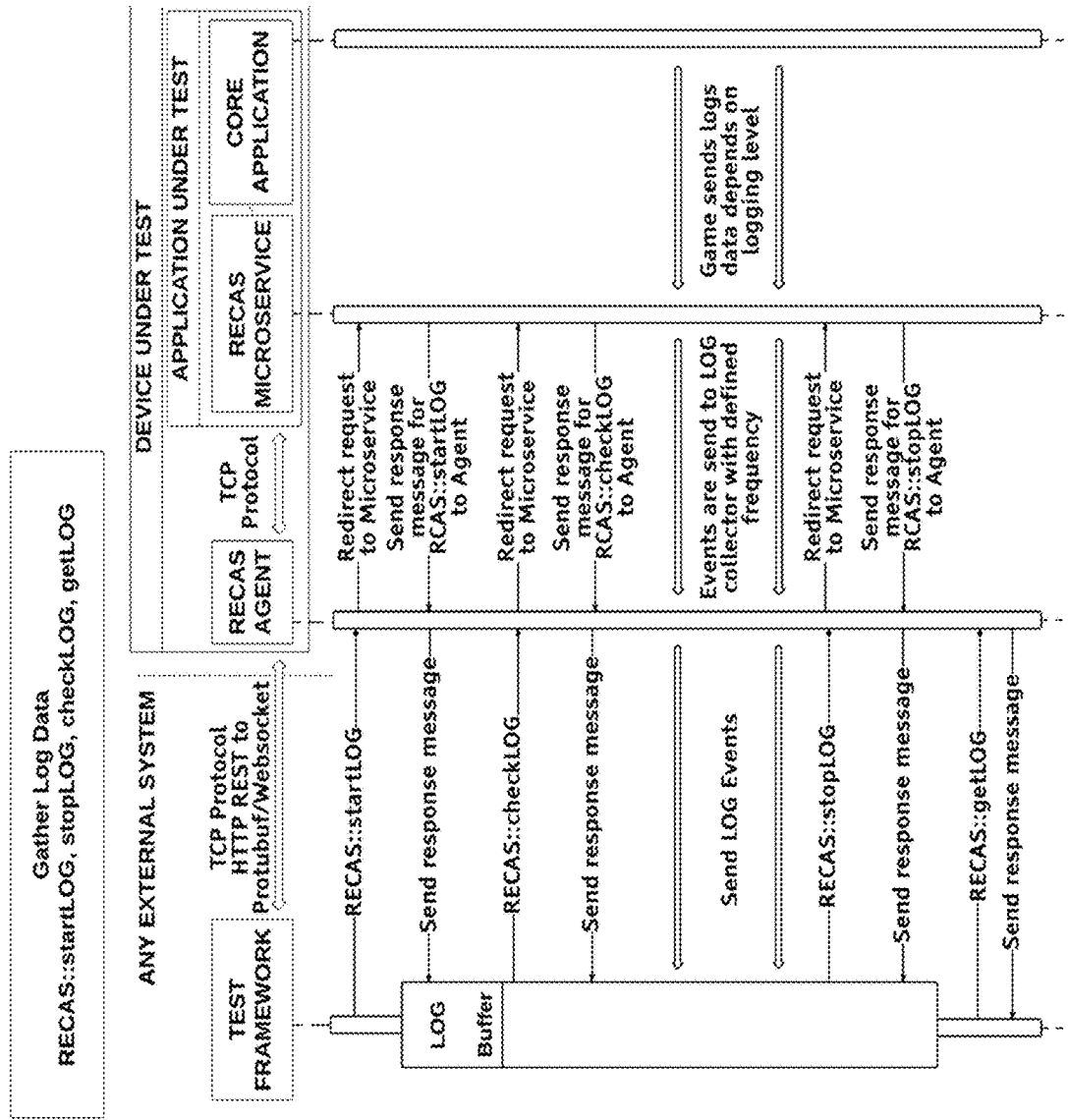
Figure 4K:
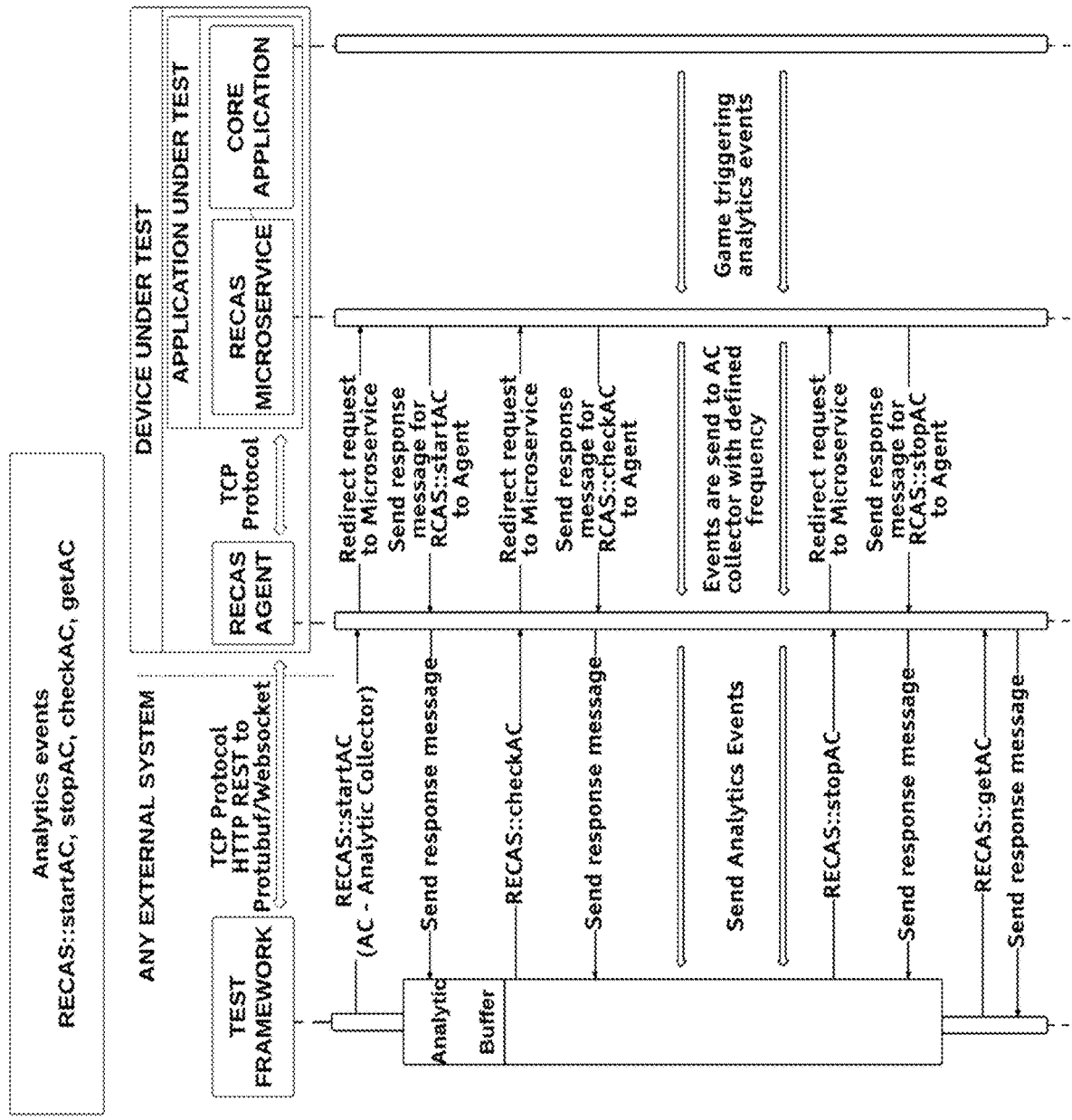

FIG. 4*j* shows a block diagram of the functions recas::startlog, stoplog, checklog, getlog. These functions handle log tracing information from tested application. The functions provide different levels of debug log details from application under test, engine and platform layer. It is up to developer implementing RECAS, what exactly logging level will be supported FIG. 4*k* shows a block diagram of the functions RECAS::startAC, stopAC, checkAC, getAC. The functions provide analytics which is important element of application business, especially visible in mobile applications and web applications. The function provides correctness of the analytics functionality in critical and manual testing of it is time consuming. The function provides automatization of analytics testing, by providing analytics data gathering, probing and checking correctness. It is up to developer implementing RECAS, what exactly analytics data will be extracted.

Figure 5:
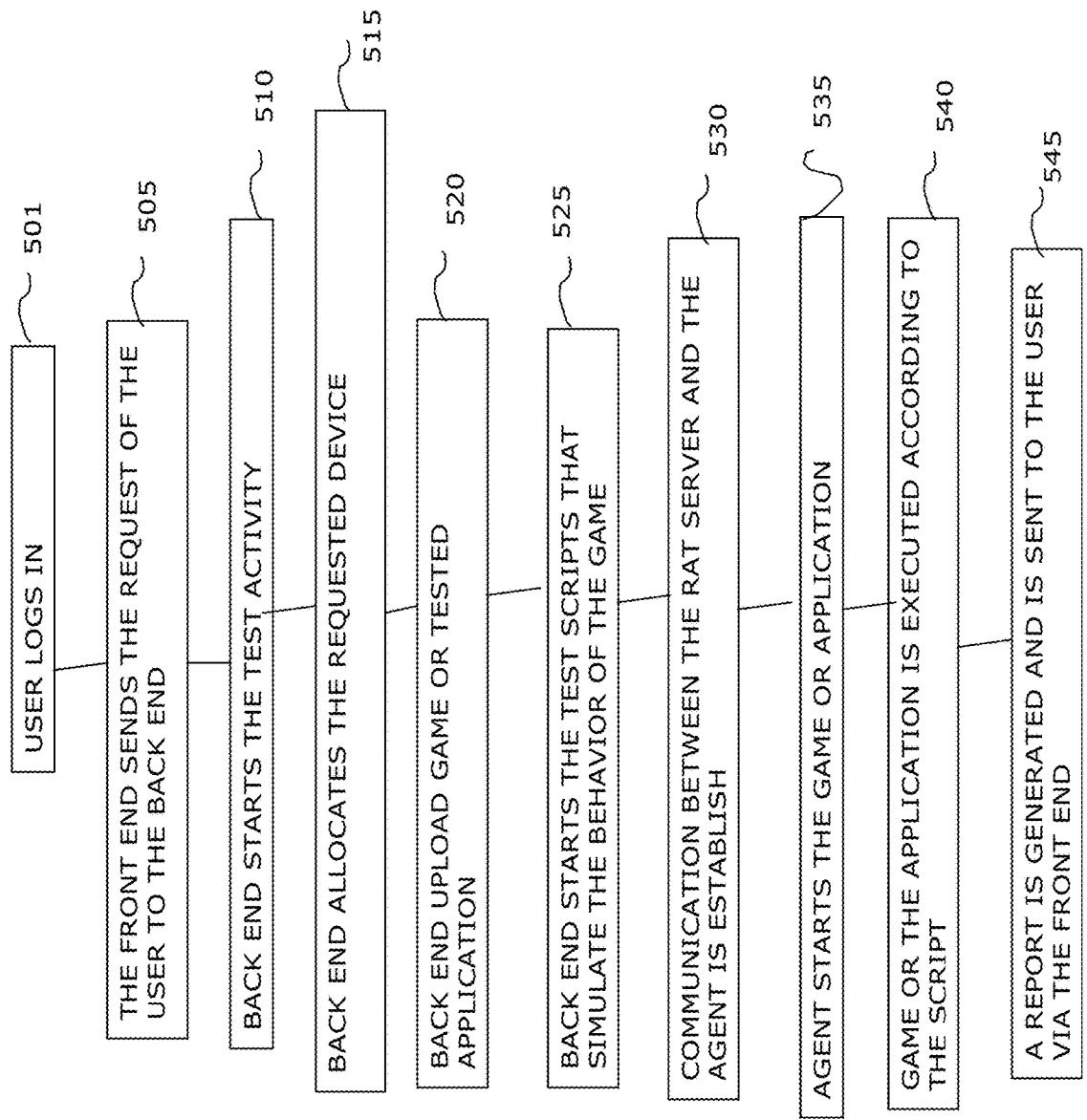
FIG. 5 shows a scenario of using the external system which utilizes Rendering Engine Component Abstraction System; in accordance with some exemplary embodiments of the subject matter.

FIG. 5 shows a scenario of using the system for rendering engine component abstraction; in accordance with some exemplary embodiments of the subject matter. The user may also select the object/element/component property of the game/application that have to be tested.

At block 501 the user logs into system. The log in is after registration. The user selects the mobile device from which the test is executed, the game or application to be tested, the device on which the tested game or application runs and the test script (scenario). The user uploads the game build.

At block 505 the front end sends the request of the user to the back end. The request includes information about the test.

At block 510 the back end starts the test activity.

At block 515 the back end allocates the requested device.

At block 520 the back end installs the game build.

At block 525 the back end launches the agent on the device and starts the execution of the test scripts that simulate the behavior of the game.

At block 530 the communication between the RAT server and the agent is establish. In some embodiments, from this point onward all of the communication between test on backend and RECAS is through RAT.

At block 535 Backend asks RECAS to launch the tested application on the device. The agent starts the game or application.

At block 540 the game or the application is executed according to the script by sending commands to RECAS to control and test the application.

At block 545 which occurs when the script ends, a report is generated and is sent to the user via the front end.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

The invention claimed is:

1. A system for testing a game build on top of a rendering engine, the system comprises:
    an agent configured for running on a first computing device, wherein said first computing device is configured for running a game, and wherein said game is built on top of a rendering engine;
    a microservice embedded in said rendering engine;
    a test framework installable on a second computing device, said test framework is configured for receiving one or more instructions related to a test of said game from a user and for transmitting said one or more instructions to said microservice through said agent, said one or more instructions being for interacting with a graphical element of said game;
    wherein said agent is further configured for forwarding said instructions between said test framework and said microservice; wherein said microservice comprises API (application programming interface) commands configured for extracting one or more instructions and for providing to said test framework an access to said one or more properties, said extracting bypassing a window manager and a user interface (UI) controller layer of an operating system of the first computing device;
    wherein said test framework is further configured for interacting with said one or more properties via (i) the window manager, (ii) the agent, and (iii) the UI controller of the operating system, and wherein said test framework is further configured for utilizing said one or more properties for said interacting with said graphical element while operating game to test said game.

2. The system of claim 1, wherein said test framework is further configured for interacting with said one or more properties, received from said agent.

3. The system of claim 1 wherein said one or more instructions comprises a selection of said one or more properties and wherein said test framework is further configured for receiving from said user said selection of said one or more properties to be tested and for interacting only with said selection.

4. The system of claim 1 wherein said one or more properties comprise at least one member of a group consisting of visibility on a screen or scene, size, position, clickability and touchability.

5. The system of claim 1 wherein said microservice is further configured for detecting said graphic element prior to said extracting.

6. The system of claim 1 wherein said agent is a proxy agent.

7. A method for testing a game build on top of a rendering machine comprises:
    receiving, by a test framework installed on a first computing device, from a user, one or more instructions related to a test of a game built on top of a rendering engine executing on a second computing device, wherein the one or more instructions include one or more instructions for extracting one or more properties of a graphical element of the game and one or more instructions for providing to the test framework an access to the one or more properties;
    transmitting, by the test framework, the one or more instructions to an agent executing on the second computing device;
    receiving, by a microservice embedded in the rendering engine executing on the second computing device, from the agent, the one or more instructions;
    extracting, by the microservice, the one or more properties of the game in response to the one or more instructions, wherein extracting further comprises bypassing a window manager and a user interface (UI) of an operating system of the second computing device;
    providing, by the microservice, to the test framework, the access to the one or more properties; and
    testing, by the test framework, the game by utilizing the one or more properties for interacting with the graphical element, wherein said test framework is configured for interacting with the one or more properties via (i) the window manager, (ii) the agent, and (iii) the UI controller of the operating system.

8. The method of claim 7 wherein said one or more instructions comprises a selection of said one or more properties and further comprising receiving from said user said selection of said one or more properties to be tested and interacting only with said selection.

9. The method of claim 7 further comprising detecting, by the microservice, said graphic element prior to said extracting, wherein said detecting bypasses the window manager and the UI controller layer.

10. The method of claim 7, wherein said agent is a proxy agent.

* * * * *

UNITED STATES PATENT AND TRADEMARK OFFICE
CERTIFICATE OF CORRECTION

| | |
|---|---|
| PATENT NO. | : 11,237,948 B2 |
| APPLICATION NO. | : 16/030873 |
| DATED | : February 1, 2022 |
| INVENTOR(S) | : Artur Boniecki |

It is certified that error appears in the above-identified patent and that said Letters Patent is hereby corrected as shown below:

On the Title Page

In the illustrative figure, Tag 310, Line 3, delete "Corelation" and insert -- Correlation --.

In the Drawings

In Sheet 2 of 15, FIGURE 2, Line 2, in the text delete "embeded" and insert -- embedded --, therefor.

In Sheet 3 of 15, FIGURE 3, Tag 310, in the text delete "Corelation" and insert -- Correlation --, therefor.

In the Specification

In Column 1, Line 58, delete "base" and insert -- based --, therefor.

In Column 2, Line 15, delete "(eg." and insert -- (e.g. --, therefor.

In Column 2, Line 31, delete "and not" and insert -- and do not --, therefor.

In Column 3, Line 22, delete "test" and insert -- tests --, therefor.

In Column 5, Line 24, delete "layer" and insert -- system --, therefor.

In Column 5, Line 33, delete "layer" and insert -- system --, therefor.

In Column 5, Lines 38-39, delete "micro-service 203." and insert -- micro-service engine 203. --, therefor.

In Column 5, Line 52, delete "micro-service 203." and insert -- micro-service engine 203. --, therefor.

Signed and Sealed this
Twentieth Day of December, 2022

Katherine Kelly Vidal
*Director of the United States Patent and Trademark Office*

CERTIFICATE OF CORRECTION (continued)
U.S. Pat. No. 11,237,948 B2

In Column 5, Lines 52-53, delete "micro service engine 203" and insert -- micro-service engine 203 --, therefor.

In Column 5, Line 55, delete "micro-service 203" and insert -- micro-service engine 203 --, therefor.

In Column 5, Line 59, delete "micro service 203" and insert -- micro-service engine 203 --, therefor.

In Column 5, Line 61, delete "micro service engine 203" and insert -- micro-service engine 203 --, therefor.

In Column 6, Line 30, delete "layer" and insert -- layers --, therefor.

In Column 6, Line 33, delete "for configure them." and insert -- for configuring them. --, therefor.

In Column 6, Line 45, delete "has own" and insert -- has its own --, therefor.

In Column 6, Line 46, delete "upload own" and insert -- upload their own --, therefor.

In Column 6, Line 51, delete "trough" and insert -- through --, therefor.

In Column 8, Line 22, delete "features. in case" and insert -- features. In case --, therefor.

In Column 8, Line 48, delete "functions includes" and insert -- function includes --, therefor.

In Column 9, Line 9, delete "that have" and insert -- that has --, therefor.

In Column 9, Line 10, delete "log in" and insert -- login --, therefor.

In Column 9, Line 25, delete "is establish." and insert -- is established. --, therefor.